Feb. 19, 1924. 1,484,166
S. WOLK
SCRAPER
Filed March 15, 1923
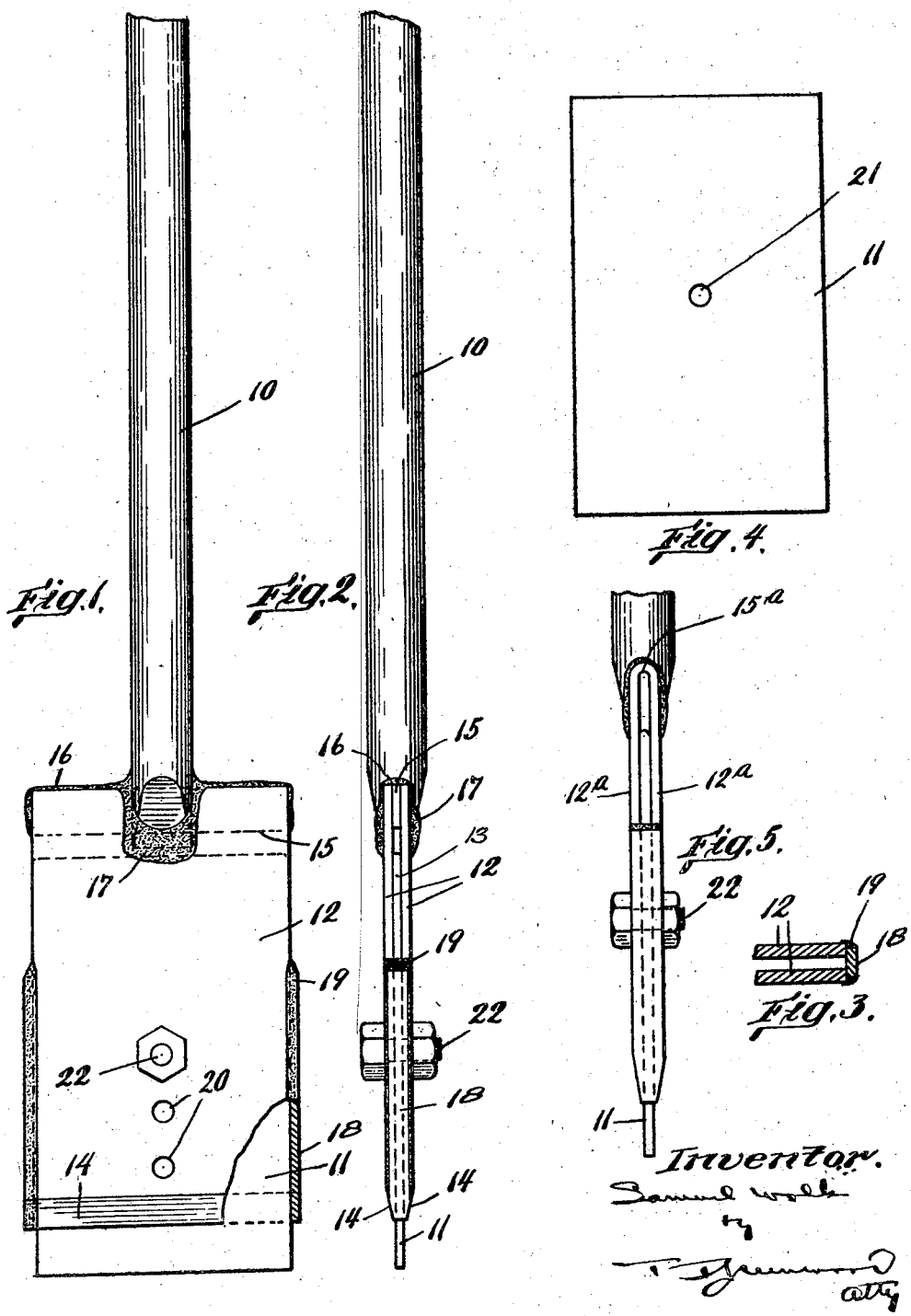

Patented Feb. 19, 1924.

1,484,166

UNITED STATES PATENT OFFICE.

SAMUEL WOLK, OF DORCHESTER, MASSACHUSETTS.

SCRAPER.

Application filed March 15, 1923. Serial No. 625,353.

*To all whom it may concern:*

Be it known that I, SAMUEL WOLK, a subject of the Russian Government, residing at Dorchester, in the county of Suffolk and State of Massachusetts, have invented an Improvement in Scrapers, of which the following is a specification.

This invention relates to scrapers and particularly to roofers' scrapers and has for its object to provide a scraper of improved and inexpensive and effective construction.

Fig. 1 is a front elevation, partially in section, of a scraper embodying the invention.

Fig. 2 is a side elevation of Fig. 1.

Fig. 3 is a sectional detail illustrating the manner of joining the side plates and the top and bottom holding-plates.

Fig. 4 is a plan view of a scraper blade.

Fig. 5 is a side view of a modified form of scraper.

The scraper here shown comprises a handle 10 with means at the lower end thereof to hold adjustably a cutting blade 11 with the forward end thereof exposed for service. Said blade 11 is usually formed of a relatively thin plate of steel. The holding means for said plate comprises the two approximately parallel flat holding plates 12 which, preferably, have a width substantially equal to the width of the blade 11. Said plates 12 are integrally connected at their upper ends and are spaced apart to a distance approximately equal to the thickness of said blade, whereby to provide a pocket or channel 13 in which said blade 11 is received. Said blade is adapted to extend forwardly beyond the lower edges of said plates 12; and the forward edges of said plates may be chamfered or relieved as indicated at 14.

Preferably said plates 12 are integrally united at the upper ends thereof. For this purpose a spacer plate 15 may be disposed between said plates 12 and extended substantially co-extensive the width of said plates. Said plates 12 and 15 may be integrally united by suitable means as for instance welding a metal bonding material 16 to all of said plates around the top and upper portions of the side edges thereof. Said handle 10 is or may be formed with a recess or slot in the lower end portion thereof in which said plates 12 and 15 are received and said handle and plates may be secured together as by welding a suitable metal binder 17 thereto. With this arrangement, the handle 10 is in effect integral with said plates 12.

Means are provided to hold said cutting blade 11 in the pocket 13 between said holding plates 12 and against lateral displacement therein. Said means may comprise the side plates 18 which are disposed against the side edges of the plates 12, at the lower portion thereof, and which, preferably, are welded and united to said plates 12 by the metal binder 19. Said cutting blade 11 is subject to wear and means are provided to extend said knife outwardly beyond the lower edge of the holding means whereby to recondition the device for further effective service. Said means may comprise a plurality of sets of aligned holes 20 in the lower portion of said plates 12. Said cutting blade 11 is formed with a single hole 21 therethrough which is adapted to be aligned with any of said set of holes 20. A bolt 22 is adapted to be passed through any of the sets of aligned holes 20 and the hole in the cutting blade 11 whereby to secure said cutting blade in fixed position in the holding means. When the blade 11 becomes sufficiently worn it may be moved outwardly in the holding means and the hole 21 therein may be aligned with the next lowermost set of holes 20 in the plates 12 and the bolt 22 passed through said aligned holes and fixed in position.

In lieu of forming the holding means of two separate plates 12 which are integrally united by means of the spacer plate 15 and the binding material 16, said holding means may be made of a single strip of material reflexed upon itself to provide the side plates 12$^a$ which are integrally connected through the connecting and separating reflexed portion 15$^a$, as illustrated in Fig. 5. The construction illustrated in Figs. 1 and 2, however, is preferred by reason of reduced manufacturing expense and the superior product formed.

The scraper herewith described is manufactured from its separate parts united mainly by autogenous welding to form a device all parts of which are, in effect, integral and the scraper, thereby, may possess the strength of one machined out of solid material, and be materially less expensive to manufacture.

I claim:

1. A scraper comprising a pair of spaced parallel holding plates integrally united at the upper ends and at the lower side edges thereof, whereby to form a pocket between them adapted to receive a cutting blade, said plates having a line of aligned bolt-openings therethrough extended rearwardly from the lower edges thereof, and a handle integrally united to said plates at the upper edges thereof.

2. A scraper comprising a pair of spaced parallel holding plates integrally united at the upper ends and at the lower side edges thereof whereby to form a pocket between them adapted to receive a cutting blade, said plates having a plurality of aligned bolt-openings therethrough extended in a line rearwardly from the lower edges thereof, and a handle having a slot in its lower end in which the upper ends of said plates are received, and a binding metal integrally uniting said plates and handle.

3. A scraper comprising a pair of parallel holding-plates integrally united at the upper ends thereof and spaced apart to provide a pocket between them adapted to receive and support a cutting blade, side plates extended between and integrally united with said holding plates at the lower side edges of said holding plates, said holding plates having a plurality of sets of aligned bolt-openings therethrough arranged in line at the lower end-portion of the plates, and a handle integrally united with said plates at the upper ends thereof.

4. A scraper comprising a pair of parallel holding-plates integrally united by a metal binder at the upper ends thereof, and spaced apart to provide a pocket between them adapted to receive and support a cutting blade, side plates extended between said holding-plates and having means comprising a metal binder uniting said side plates with the lower side edges of said holding-plates, and a handle having a slot in its lower end in which the upper ends of said united holding plates are received, and means comprising a metal binder integrally uniting said plates and handle.

5. A scraper comprising a pair of parallel holding-plates spaced apart to provide a pocket between them adapted to receive and support a cutting blade, a spacer plate disposed between said holding plates at the upper ends thereof, means uniting said holding and spacer plates, said holding-plates having side plates extended between and connecting them at the lower side edges thereof, and also having a set of aligned bolt-openings therethrough, and a handle connected with the upper ends of said holding plates.

6. A scraper comprising a pair of parallel holding-plates spaced apart to provide a pocket between them adapted to receive and support a cutting blade, a spacer plate disposed between said holding-plates at the upper end thereof, means including a metal binder integrally uniting all plates, said holding-plates having side plates extended between and connecting them at the lower side edges thereof, means including a metal binder integrally uniting said side and holding-plates, said holding-plates also having sets of aligned bolt-openings therethrough extended in a line rearwardly from the lower edges of said plates, and a handle having a slot in its lower end in which the upper ends of said holding-plates are received, and means including a metal binder integrally uniting said holding-plates and handle.

In testimony whereof, I have signed my name to this specification.

SAMUEL WOLK.